UNITED STATES PATENT OFFICE.

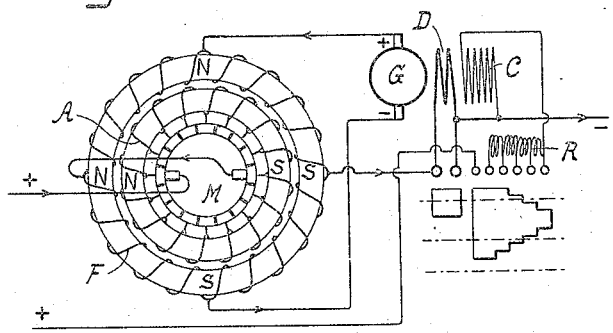
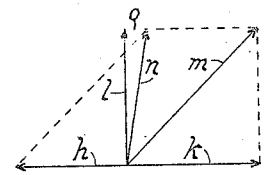
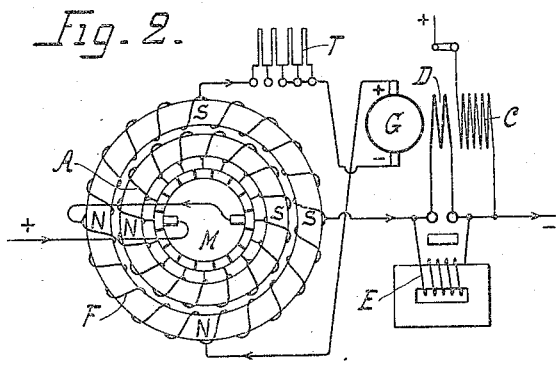
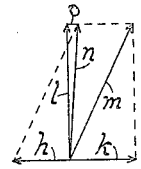
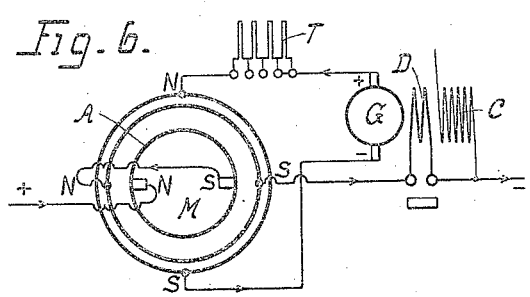
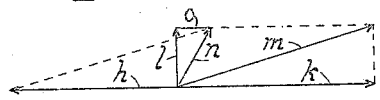

ROBERT LUNDELL, OF NEW YORK, N. Y.

ELECTRIC REGENERATIVE MOTOR AND SYSTEM OF CONTROL.

1,127,464.  Specification of Letters Patent.  Patented Feb. 9, 1915.

Application filed March 13, 1911. Serial No. 613,957.

*To all whom it may concern:*

Be it known that I, ROBERT LUNDELL, a citizen of the United States, and resident of New York, borough of Manhattan, county and State of New York, have made a new and useful Invention in Electric Regenerative Motors and Systems of Control, of which the following is a specification.

The present invention relates to improvements in separately excited motors or dynamos and in the series-parallel control of such motors or dynamos when used in connection with regenerative traction work or similar service.

The objects of the invention are—First, to provide novel means by which the characteristic of a separately excited motor may at will be changed into the characteristic of a compound wound motor or a series motor without the aid of additional excitation windings or other complications of the main motor windings. Second, to combine such novel means for varying the characteristic of a separately excited motor—with a regenerative system of series-parallel control for two or more motors of the interpole or the compensated type, whereby superior results may be obtained in regard to efficiency, smoothness of acceleration or retardation, simplicity, and general reliability.

My invention can best be described in connection with a type of motor which I have previously described in U. S. Patent No. 857,184, granted to me on the 10th day of June, 1907. Particular attention is called to Figure 6 of the drawings of this patent and the description pertaining thereto, as the present invention is a direct improvement upon or an amplification of the apparatus disclosed by the said figure.

My invention will best be understood by reference to the accompanying nine figures of the drawings, all of which are diagrammatic, and in which—

Figure 7:
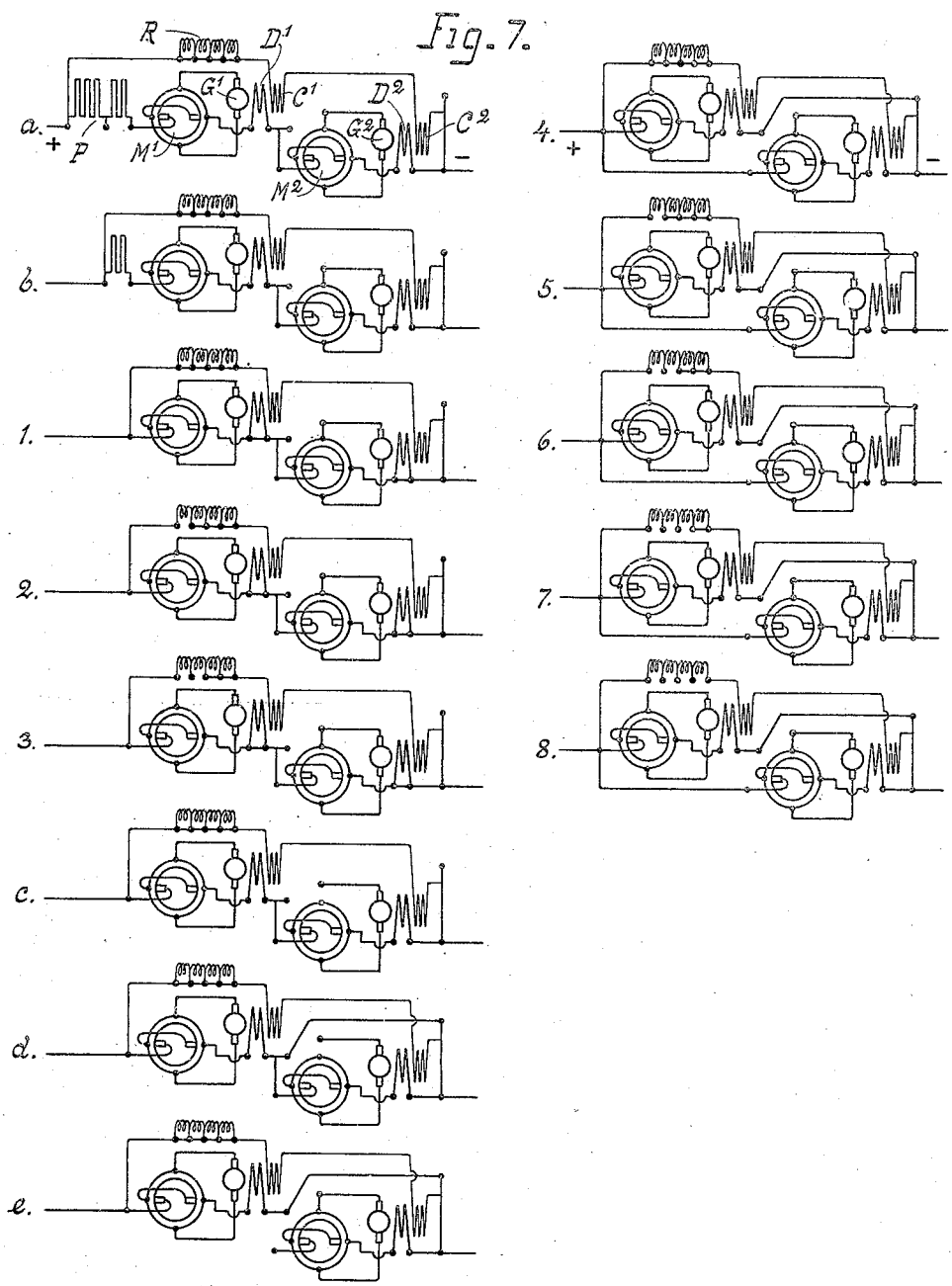
Figure 8:
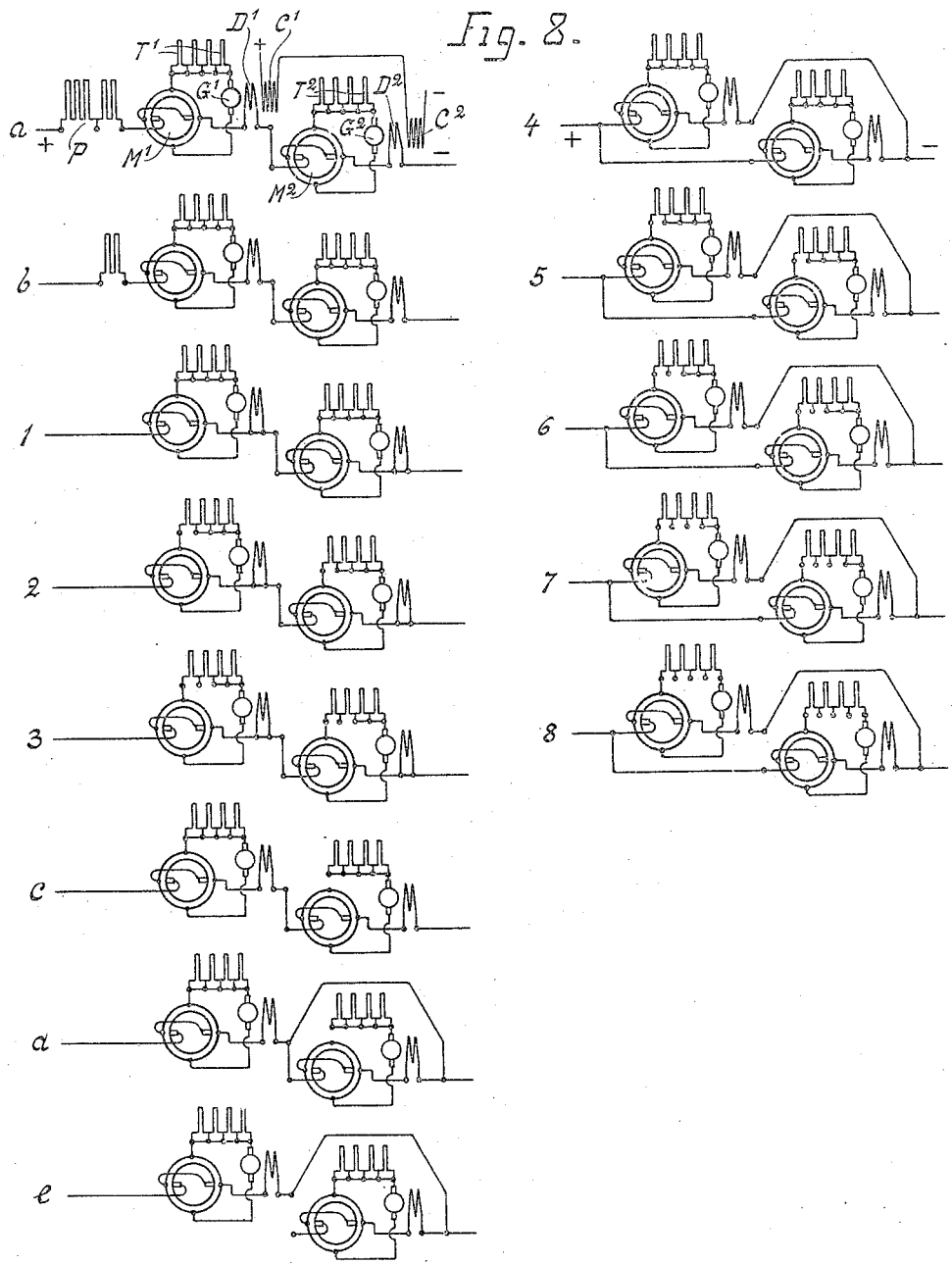
Figure 9:
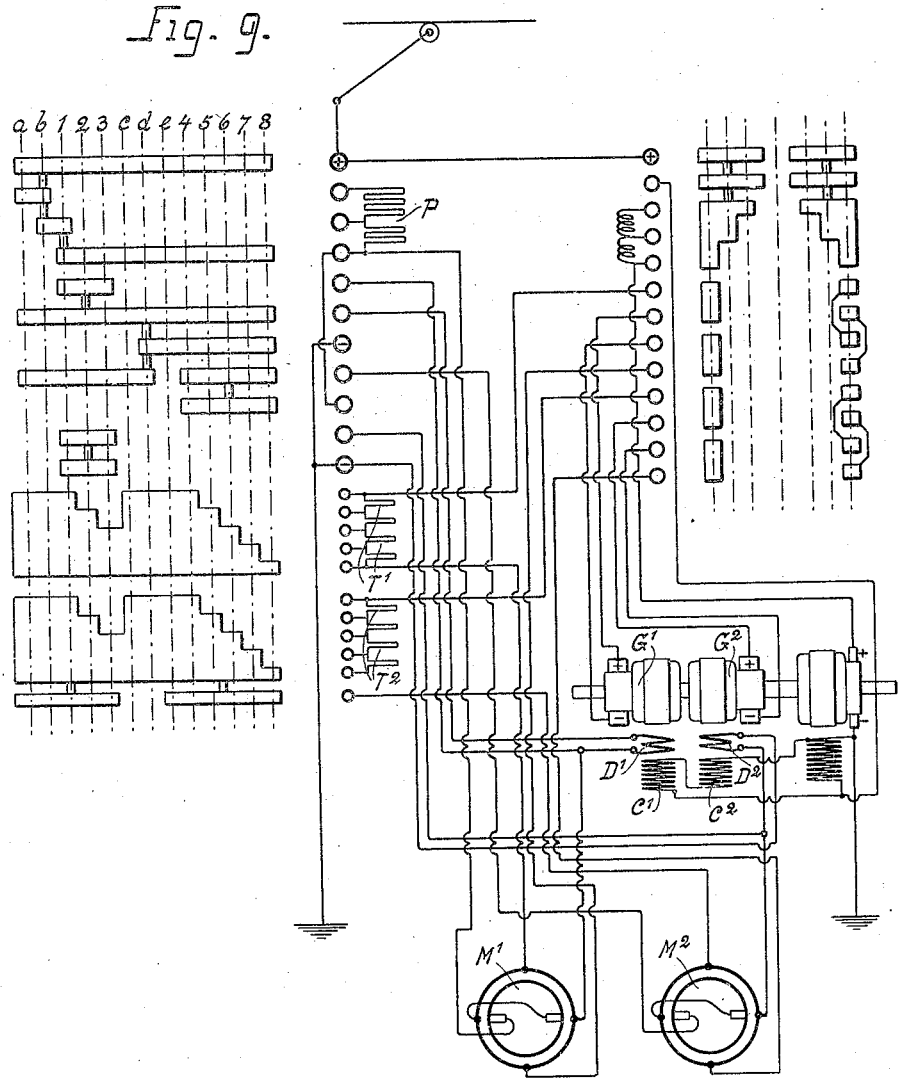

Fig. 1 indicates a single main motor and an independent or separate source of current supply for the field excitation of the said main motor, together with means for regulating the rate and the character of the said excitation according to my present invention. Fig. 2 shows the same main motor, as indicated in Fig. 1, with a modification of the means employed for regulating the excitation of the said main motor. This figure indicates also the method of reversing the direction of rotation of the main motor. Figs. 3, 4 and 5 are vector diagrams which indicate the relative values of the various field strengths in connection with the main motor shown in Figs. 1 and 2. Fig. 6 indicates a main motor which, for comparison, has been furnished with two field windings in place of the single field winding shown in Figs. 1 and 2. Fig. 7 indicates the successive circuit changes in a system of series-parallel control which comprises two main motors and in which the individual units are arranged according to Fig. 1. Fig. 8 is substantially the same as Fig. 7, except that the individual units have been arranged according to Fig. 2. Fig. 9 indicates a switch or controller arranged to effect the various circuit changes which are particularly shown in Fig. 8.

Referring now to the figures in detail— Fig. 1 shows a main motor M having a distributed field winding F and a distributed armature winding $a$, both windings being of the same type, that is, either ring or drum windings embedded in the iron according to usual practice. The diagram illustrates a two-pole arrangement, but the actual motor should for obvious reasons be of a multipolar construction.

The windings are so proportioned that the ampere-turns per pole in the field winding somewhat exceed the corresponding armature ampere-turns, so that, when these two windings are connected in opposition, the difference between the respective ampere-turns will produce a commutation field of the required strength. It will be noticed that the field winding is furnished with four leads; two of these are used as a line current inlet for the purpose of producing a compensating field in opposition to the armature field. The other two leads, located at 90 electrical space degrees from the first mentioned leads, are connected to an independent source of current supply— preferably a small low voltage motor-generator G the sole duty of which is to furnish the excitation current for the main motor.

The arrangement so far is identical with that proposed in connection with Fig. 6 of the above-mentioned U. S. Patent No. 857,184—see lines 82 to 85, page 3 of the specification. That is to say, a single distributed field winding is here caused to act simultaneously as a winding for excitation capable of regulation, a winding for compensation, and a winding for commutation. It will be understood that the motor becomes a separately excited motor or a separately excited dynamo when the field terminals employed for leading in the line current are so located that the magnetization produced thereby is directly opposing the magnetization of the armature without any angular difference whatever. The excitation field is then no longer influenced by the armature current and the motor characteristic is equal to that of a shunt wound or a separately excited motor. Although such a motor is in no sense a compound-wound or a series motor, it becomes possible by the present invention to change its characteristic at will into that of a compound-wound or a series motor. This is accomplished entirely by external means or by furnishing the small generator G (the exciter) with both shunt and series field windings C and D, as clearly shown in Fig. 1. If the said series field windings are included in the armature circuit of the main motor, as shown, it becomes evident that the characteristic of the main motor M may readily be varied to suit requirements. For instance, if the shunt field windings of the generator G are disconnected from the power circuit and the series field windings alone are in the main circuit—the characteristic of the main motor clearly becomes similar to that of a plain series motor. If, on the other hand, the series field winding is short-circuited and the shunt field winding is connected to the power circuit, the characteristic becomes equal to that of a separately excited motor or a shunt motor. When both of the field windings C and D are in service the characteristic of the main motor becomes similar to that of a compound-wound motor. Obviously this arrangement is exceedingly flexible, and it is in addition simple and reliable because it avoids any complication in the windings of the main motor. The rate of excitation as well as the rate of compounding of the main motor may conveniently be regulated by the resistances R included in the shunt field circuit of the generator G. These resistances are most conveniently manipulated by the aid of a small rotary switch, of which the stationary and the movable contacts are clearly shown in Fig. 1. This switch is also arranged to short-circuit the series field winding D and to disconnect the shunt winding C of the exciter G at certain positions of the said movable contacts, as indicated on the drawing. The rate of excitation may also be regulated by resistances T included in the excitation circuit, as clearly shown in Fig. 2. In order to reverse the direction of rotation of this type of motor it is merely necessary to reverse the current in the excitation winding, as clearly shown in Fig. 2. The series field winding of the generator G may only carry a portion of the current which traverses the armature of the main motor. It is, in fact, advantageous to divert part of the said current through an inductive resistance E, as shown in Fig. 2, provided the same is so constructed that its self-induction is greater than that of the series field winding of the generator G. The generator G is in this manner made especially sensitive and responsive to any changes in the current through the armature circuit of the main motor.

The space vector Diagrams Figs. 3, 4 and 5 illustrate clearly the relative values of the different field strengths (or the magneto motive forces) and the manner in which they vary according to the load and the changes in the excitation. In these figures $h$ represents the armature field, $k$ the compensating and the commutating field, $m$ the resultant field without including the armature reaction, $n$ the resultant field including the armature reaction, and $o$ represents the commutation field. Fig. 3 shows the conditions resulting from full field excitation and normal full load armature current. Fig. 4 illustrates full excitation and half load. Fig. 5 shows reduced field excitation in connection with 50% overload.

The results obtained in connection with the above mentioned single distributed field winding are identical with those obtained in connection with Fig. 6, wherein the field winding is illustrated as having been split up into two distinct distributed windings, one for compensation and commutation (next to the armature winding) and another for excitation, each of said windings being represented by a heavy circle in the diagram. This figure is merely shown for the sake of comparison. It will be understood that a motor constructed according to the arrangement shown in Fig. 6 would have very much more copper and greater dimensions, besides being more complicated. The compensating and the commutating winding alone must clearly be equal to the single winding F shown in Figs. 1 and 2, if the efficiency is to be the same, and the separate excitation winding will, of course, require a great amount of additional copper and additional room.

Fig. 7 illustrates diagrammatically, in a system of series-parallel control, the successive changes in the circuit connections of a pair of mechanically connected regenerative traction motors arranged according to Fig. 1. $M^1$ and $M^2$ represent the main motors and $G^1$ and $G^2$ the small generators for energizing the fields of the separately excited main motors. $D^1$ and $D^2$ represent, respectively, the series field windings, and $C^1$ and $C^2$ the shunt field windings of the small generators. P represents the usual starting resistances for the main motors and R represents field regulating resistances for the two shunt field windings of the small generators $G^1$ and $G^2$. The circuit diagrams designated by the letters $a$, $b$, $c$, $d$, and $e$ represent certain transition connections and the other diagrams designated by the numbers 1 to 8 represent the actual working connections for the motors.

Looking at $a$ it will be noticed that the two compensated motors $M^1$ and $M^2$ are connected in series and that the whole of the starting resistance is in circuit. The motors are at the same time receiving their maximum excitation current because the field magnets of $G^1$ and $G^2$ are fully energized from both the shunt and the series field windings, as clearly shown in the diagram.

In Diagram $b$ a portion of the starting resistance is cut out. Between $b$ and the working position indicated by Diagram 1 the last portion of the starting resistance has been cut out and the series field windings $D^1$ and $D^2$ have subsequently become short-circuited by the controller. The field excitation of the main motors has, therefore, been somewhat reduced in Diagram 1. There is in this diagram only a slight difference between the "motor-speeds" and the corresponding "dynamo-speeds" because the main motors are now working with characteristics similar to shunt motors operating without external armature resistance.

In the working position indicated by Diagram 2 the shunt excitation of the generators $G^1$ and $G^2$ has been somewhat reduced and the main motors have, consequently, increased their speed. If the torque of the main motors is to remain constant the armature current will, of course, increase in proportion to the reduction in the field strength—same as for any adjustable speed motor. Diagram 3 shows the main motors working under an additional reduction of field excitation and their speed has, of course, been correspondingly increased.

We will now assume that the field strength of the main motors is about one-half of the field strength during the starting positions $a$ and $b$. Each motor consumes, of course, one-half of the line voltage and the torque of each motor is the same as in Diagram $a$ or $b$, provided the armature current has been doubled.

In the transition position indicated by Diagram $c$ the field excitation of motor $M^1$ has suddenly been restored to a full maximum and the field excitation of motor $M^2$ has simultaneously been reduced to zero, the excitation circuit from the generator $G^2$ having been opened, as clearly shown in the diagram. This causes the motor $M^1$ to consume nearly the full line voltage, whereas motor $M^2$ only consumes a small amount of the line voltage due to the internal resistances of the armature and the compensating windings. Motor $M^1$, furthermore, carries the entire load, which it can do without being over-loaded, because its torque with maximum field strength is equal to the combined torque of both motors in Diagram 3, provided the current through the armature circuit remains the same as in Diagram 3. Motor $M^2$ clearly produces no torque, but runs along at the same speed, being mechanically connected to $M^1$.

In the transition position $d$ motor $M^2$ has been short-circuited with zero field excitation and motor $M^1$ is now receiving the full line voltage. The speed is, consequently, a trifle greater than in Diagram $c$. In transition Diagram $e$ the motor $M^2$ is merely disconected from the + line and made ready to be connected in parallel with motor $M^1$. It will be noticed that the series field windings of $G^1$ and $G^2$ have been connected in circuit during the transition steps $c$, $d$, and $e$. The motor which carries the load will, therefore, act as a compound-wound motor during acceleration and as a differentially wound generator during retardation. That is, it will in either case have the proper drooping characteristic which insures smooth acceleration or retardation.

Diagram 4 illustrates the first working position when the motors are in parallel. If the total current from the line remains the same as in Diagram $e$, it follows that each motor will again consume one-half of this current or about the same current as in the starting position $a$ or $b$. The series field windings of the generators $G^1$ and $G^2$ being included in their respective armature circuits of the main motors, it follows that the main motors will thereby be given a certain self-regulating quality, which in turn will insure a proper division of the load. In the following Diagrams 5, 6, 7 and 8 the shunt excitation of the generators $G^1$ and $G^2$ is successively reduced and the speed of the main motors increased. In the final working position 8 the shunt excitation of the generators $G^1$ and $G^2$ has been very much reduced and the excitation from the series field windings is, of course, considerable, because the current in the armature circuits of the main motors has increased as the field strength has been reduced. The main motors will, therefore, have characteristics similar to compound-wound motors having strong series—and comparatively weak shunt-field windings. Such a characteristic will in turn produce a very wide difference between the "motor speeds" and the "dynamo speeds" for this position.

Should it be desirable to make the top speeds more definite, so as to prevent racing under light loads, such a modification may best be accomplished by keeping the shunt excitation of the generators $G^1$ and $G^2$ constant and by regulating the field strength of the main motors according to the method shown in Fig. 2.

Fig. 8 illustrates such a modification of the regenerative system of control described above. As each individual diagram of Fig. 8 corresponds with the diagrams of Fig. 7, when the indexes are the same, a minute description of Fig. 8 would merely amount to a repetition of previous remarks, and it is, therefore, omitted. Diagram $a$ of Fig. 8 shows the shunt field windings of the generators $G^1$ and $G^2$. As there is no change in the shunt excitation of $G^1$ and $G^2$ during the various steps the said shunt field windings have been omitted in the subsequent diagrams.

Fig. 9 illustrates a switch or controller of ordinary construction together with all of the circuit connections between the stationary contacts of the said controller, the line circuit, a pair of main motors $M^1$ $M^2$, a pair of exciters $G^1$ $G^2$ with their series and shunt field windings $D^1$ $D^2$ and $C^1$ $C^2$, starting resistances P and speed regulating resistances $T^1$ $T^2$, said controller being designed to effect the various circuit changes ($a$ to 8) which are particularly shown in Fig. 8. The left hand portion of Fig. 9 illustrates, according to the usual practice, the development of the movable contacts of the said controller, which effect (at the positions $a$ to 8) the corresponding circuit changes illustrated in Fig. 8. The right hand portion of Fig. 9 illustrates in a similar manner the developed movable contacts of a switch for reversing the direction of rotation of the main motors $M^1$ $M^2$, said switch being also arranged to serve as a starting switch for the motor which drives the exciters $G^1$ $G^2$, as clearly shown on the drawing.

Having thus described my invention what I claim and desire to secure by Letters Patent of the United States is—

1. An electric motor having a single field winding for excitation connected to a separate source of current supply, said source of current supply being provided with means for changing at will the characteristic of the said motor to resemble the characteristic of either a shunt-wound motor, a compound-wound motor, or a series motor.

2. A separately excited motor having a single distributed field winding for excitation and for compensation, in combination with external means for changing at will the characteristic of the said motor to resemble the characteristic of a compound-wound motor, or a series motor.

3. A dynamo electric machine having a single distributed field winding for excitation and for compensation connected to a separate source of current supply, said separate source of current supply being provided with means for giving the said dynamo electric machine a characteristic similar to that of a compound wound machine; in combination with additional external means for varying at will the percentage of the compounding of the said dynamo electric machine.

4. Two or more separately excited motors in combination with means for changing the E. M. F. impressed upon the individual armature-circuits and additional means for changing at will the field excitation of the motors so that the same becomes more or less dependent upon the armature current or the load.

5. Two or more motors having each a single distributed field winding for excitation and for compensation, in combination with a source of independent current supply for each field winding, means for connecting the motors in series or in parallel, and additional means for changing at will the field excitation of the motors so that the same becomes more or less dependent upon the armature current or the load.

6. The combination of a plurality of separately excited motors, a controller for connecting them in series or in parallel, external means for regulating the excitation of the motors according to the desired speed changes, with additional external means for automatically varying the excitation according to the changes in the load.

7. The combination of a pair of separately excited motors having their excitation-field windings connected to independent sources of current supply, a controller for connecting the motors in series or in parallel, means for keeping the current from a power circuit closed through one of the motors during the change from series to parallel or from parallel to series, with additional means for short-circuiting the other motor with substantially zero field excitation during the aforesaid change from series to parallel.

8. The combination of a pair of mechanically connected motors having each a single distributed field winding for excitation and for compensation, a source of independent current supply for each field winding adapted to give to each motor an independent excitation, means for connecting the motors in series or in parallel, with additional means for keeping one of the motors operatively connected in a power circuit while the other motor is idle during the change from series to parallel or from parallel to series.

9. The combination of a pair of mechanically connected motors having each a single distributed field winding for excitation and for compensation, a source of independent current supply for each field winding adapted to give to each motor an independent excitation, means for changing the E. M. F. impressed upon the individual armature-circuits, with additional means for regulating the field strength of one motor independently of the other motor, so that one motor may control the speed and carry the load while the E. M. F. impressed upon the armature-circuit of the other motor is being changed.

In testimony whereof I have signed my name to this specification in the presence of two subscribing witnesses.

ROBERT LUNDELL.

Witnesses:
C. J. KINTNER,
M. F. KEATING.

Copies of this patent may be obtained for five cents each, by addressing the "Commissioner of Patents, Washington, D. C."